3,562,948
WEEDLESS FISH HOOK
Mona Santo and Michael W. Santo III, both of
47 Lake Drive, Roosevelt, N.J. 08555
Filed July 12, 1968, Ser. No. 744,589
Int. Cl. A01k 83/00
U.S. Cl. 43—43.4     13 Claims

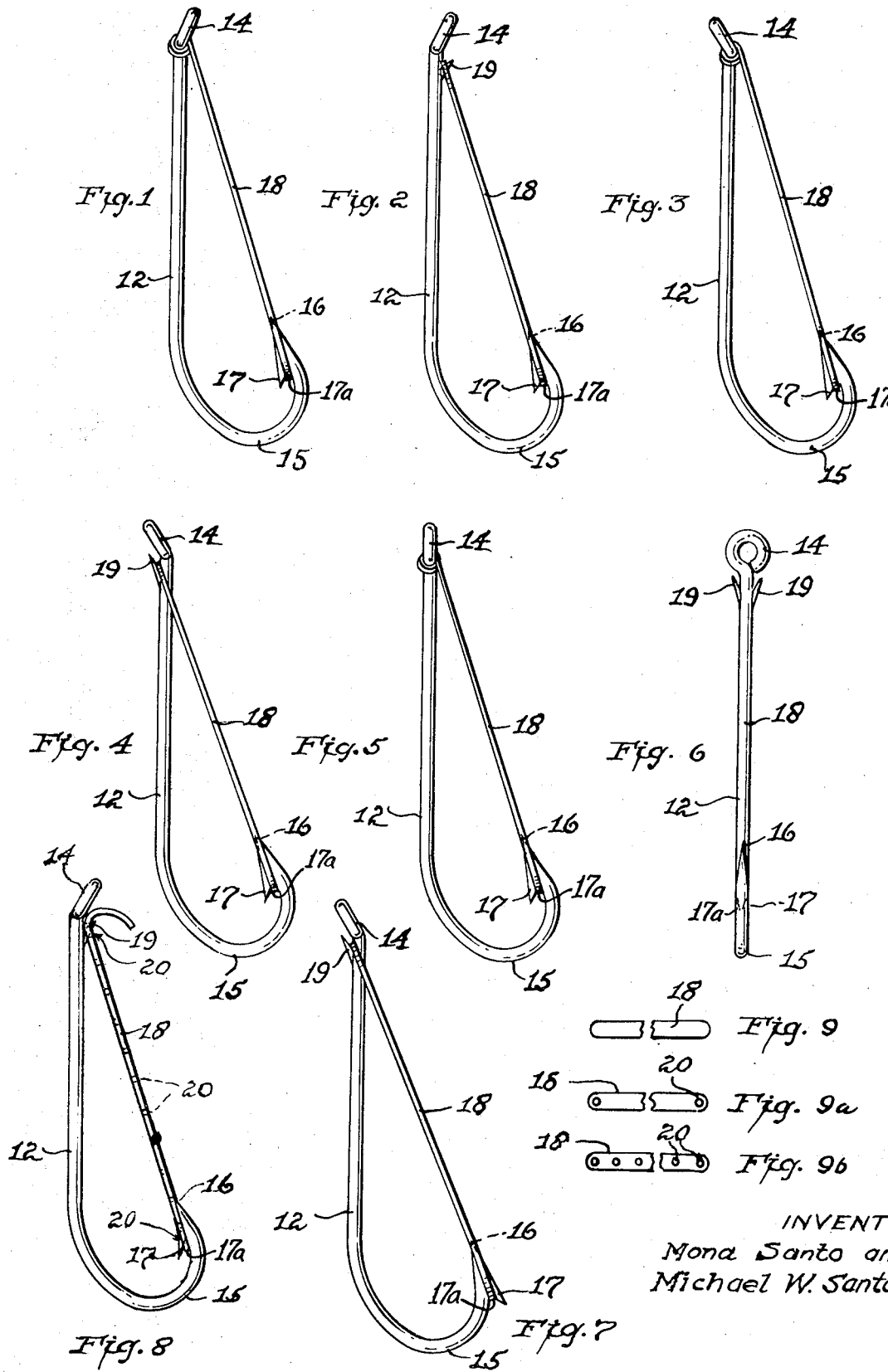

ABSTRACT OF THE DISCLOSURE

A fish hook having the point shielded by a resilient guard member looped over the barb at the pointed end of the hook, and extended to and looped through the hook eye or over a barb adjacent the hook eye to preclude snagging of the hook when drawn through weeds and the like.

---

The present invention contemplates the provision of a novel form of fish hook having a barb located on the underside of the reversely-bent portion of the hook, said barb being adjacent to or on a plane with the sharp pointed tip together with the provision of a resilient guard member such as an endless elastic band or elastic strip adapted to be positioned to bridge the gap between the pointed tip portion of the hook and the eye or a barb at the opposite end of the hook.

One of the objects of this invention is to provide a weedless fish hook having a resilient guard member secured at one end to the eye or a barb at the free end of the hook and the opposite portion of the guard member being looped around the barb which is located on the underside of the pointed tip of the hook, said barb and pointed tip being so correlated to each other and to the eye or a barb on the free end of the hook as to cause the resilient guard member to close the gap between the two ends of the hook and in so doing form a protective shield for the pointed tip of the hook.

Another object of the invention is to provide a fish hook that may be used with or without a weed guard depending on the condition of the waters to be fished.

A further advantage of the improved fish hook is the unimpaired bait holding ability of the hook when the guard member is in place.

Still another object is to provide a fish hook that is economical to manufacture.

Other objects and advantages of the invention will be apparent from a detailed study of the following description in conjunction with the accompanying drawings, in which:

FIGS. 1, 3, and 5 are side views of the invention showing the resilient guard member positioned between the eye of the hook and the main barb at the pointed tip end of the hook.

FIGS. 2 and 4 are also side views of the improved fish hook showing the resilient guard member positioned between a small barb at the eye end of the shank and the main barb at the pointed tip end of the hook.

FIG. 6 is a front view of the fish hook having its eye straight with the shank such as shown in FIG. 5 with the added feature of small barbs located at the eye end of the shank and so positioned to the eye that the barbs at that end of the hook are protected by the curvature of the eye.

FIG. 7 is a modified form of the invention showing the barb at the pointed tip end of the hook to be disposed on the outer portion of said hook shank and showing an additional barb adjacent the hook eye.

FIG. 8 is a side view similar to FIG. 1 in which the point of the hook is shielded by a single resilient strip with openings along its length, so that one strip will fit many different sizes of fish hooks.

FIGS. 9, 9a, and 9b show different forms of the single resilient strip which may be plain or with any number of openings, and varying in width, thickness and length depending on the size hook it will be applied to.

Referring to the drawings in which like numerals designate like parts in the views, FIG. 2 shows an embodiment with the eye 14 of the shank portion 12 bent forward to protect a barb 19 located on the front of the hook shank just below the eye, whereas, FIG. 4 shows an embodiment of the invention with the eye bent rearwardly to protect a barb 19 located on the rear of the shank just below the eye.

Of the two arrangements shown for the location of the main barb 17 at the pointed tip end 16 of the hook the preferred one is the barb located on the underside of the shank in that, during a strike the resilient guard member 18 secured in this manner has very little distance to travel before it becomes disengaged from the barb and thereby allows the hook point to be free of any obstruction in the taking of a fish, whereas the resilient guard member attached to the barb on the outer portion of the shank must at the time of a strike travel the entire curvature of the bend of the hook, or the guard member must break before the pointed tip is completely free of any obstruction.

The fish hooks as shown in FIGS. 1 to 6 and 8 are made of wire or any material suitable to the proper forming thereof and include the shank portion 12 with the eye 14 formed at one end for the attachment of a fishing line. The opposite portion of the shank is then extended and bent in a semi-circular contour 15 terminating in the pointed tip 16. The pointed tip 16 has the barb 17 located on the underside of the shank providing a seat 17a under the pointed tip, the guard element 18 is looped through the eye 14 and then drawn down to and around the pointed tip 16 and engaged in the seat 17a.

The fish hook as shown in FIG. 7 shows a barb 17 on the outer side at the pointed tip 16, with a guard element 18 engaged in a barb 19 adjacent the eye 14.

When a barb 19 is formed on the shank 12 at the eye 14 end of the hook the guard element 18 may then be looped over the barb 19 instead of through the eye 14 whichever is the more convenient for the user.

When using an endless resilient band as the guard element 18 the pointed tip 16 is shielded by the two strands of the band 18 which lie on both sides of the pointed tip 16.

When using a single resilient strip for the guard element 18 the pointed tip 16 is shielded by means of the guard element 18 being held firmly against the underside of the pointed tip 16. When the resilient strip 18 has openings 20 along its length the pointed tip 16 is then shielded by the strands of the strip lying on both sides of the pointed tip 16.

The barbs or anchoring points formed in conjunction with this improved fish hook at both the free end or eye end and the pointed tip end are of no special configuration and are of a type easily formed on fish hooks.

The improved fish hook will function equally well with or without barbs at the eye end of the shank however, when this hook is provided with said barbs the user then has the option of securing the guard means to the eye or the said barb whichever is the easiest and most convenient.

It will be apparent that this invention may be embodied in all types of fish hooks such as singles, doubles, trebles or in the many types of lures or other forms of artificial baits.

It will also be apparent that this invention may be embodied in the snelled variety or that type fish hook without an eye at the free end of the hook shank.

It will be apparent that the resilient guard elements used in conjunction with this invention may be in colors as well as in the natural state and may also contain as a part thereof or an attachment thereto streamers or the like.

Although various forms of the invention have been disclosed, it is not intended that the invention be limited to the exact construction disclosed, but is capable of variation and modification.

We claim:

1. The combination of a fish hook having an eye at one end thereof, a shank extending from the eye, said shank having a return bend at the opposite end thereof terminating in a pointed tip, said pointed tip having a barb on the underside of said shank located at or near the pointed tip, providing a seat under the pointed tip, said pointed tip and barb lying in a common plane with said eye, said pointed tip being directed toward said eye, a narrow, elongated, point-shielding member looped through the eye and extending down to and around the pointed tip and engaged in the said seat.

2. The combination of a fish hook having an eye at one end of a hook shank, a first barb on the shank adjacent the eye end thereof, said shank having a return bend at the opposite end thereof terminating in a pointed tip, said pointed tip having a second barb on the underside thereof located at or near the pointed tip, providing a seat near the pointed tip, said pointed tip and second barb being disposed substantially in a common plane with said eye and first barb, a narrow, elongated, point-shielding member looped over the first barb and extending down to and around the pointed tip and engaged in the said seat.

3. The combination of a fish hook having an eye at one end of a hook shank, a first barb on the shank adjacent the eye end thereof, said shank having a return bend at the opposite end thereof terminating in a pointed tip, said pointed tip having a second barb on the underside thereof located at or near the pointed tip, providing a seat near the pointed tip, said pointed tip and second barb lying in a common plane with said first barb, a narrow, elongated, point-shielding member looped over the first barb and extending down to and around the pointed tip and engaged in the said seat.

4. The combination of a fish hook having an eye at one end of a hook shank, a first and a second barb on the shank adjacent the eye end thereof, said shank having a return bend at the opposite end thereof terminating in a pointed tip, said pointed tip having a third barb on the underside thereof located at or near the pointed tip, providing a seat near the pointed tip, said pointed tip and third barb lying in a plane with the eye and in a plane passing between the first and second barbs, a narrow, elongated, point-shielding member looped over the first and second barbs and extending down to and around the pointed tip and engaged in the said seat.

5. The combination of a fish hook having an eye at one end of a hook shank, a first and a second barb on the shank adjacent the eye end thereof, said shank having a return bend at the opposite end thereof terminating in a pointed tip, said pointed tip having a third barb on the underside thereof located at or near the pointed tip, providing a seat near the pointed tip, said pointed tip and third barb lying in a plane passing between the first and second barbs, a narrow, elongated, point-shielding member looped over the first and second barbs and extending down to and around the pointed tip and engaged in the said seat.

6. The combination of a fish hook having a first barb at or near the free end of a hook shank, said shank having a return bend at the opposite end thereof terminating in a pointed tip, said pointed tip having a second barb on the underside thereof, located at or near the pointed tip, providing a seat near the pointed tip, said pointed tip and second barb disposed in a common plane with the first barb, a narrow, elongated, point-shielding member looped over the first barb and extending down to and around the pointed tip and engaged in the said seat.

7. The combination of a fish hook having a first and a second barb at or near the free end of a hook shank, said shank having a return bend at the opposite end thereof, terminating in a pointed tip, said pointed tip having a third barb on the underside thereof, located at or near the pointed tip, providing a seat near the pointed tip, said pointed tip and third barb disposed in a plane passing between the first and second barbs, a narrow, elongated, point-shielding member looped over the first and second barbs and extending down to and around the pointed tip and engaged in the said seat.

8. The combination of a fish hook having an eye at one end of a hook shank, a first barb on the shank adjacent the eye end thereof, said shank having a return bend at the opposite end thereof terminating in a pointed tip, said pointed tip having a second barb on the outer side thereof located at or near the pointed tip, providing a seat near the pointed tip, said pointed tip and second barb being disposed substantially in a common plane with said eye and first barb, a narrow, elongated, point-shielding member looped over the first barb and extending down to and around the pointed tip and engaged in the said seat.

9. The combination of a fish hook having an eye at one end of a hook shank, a first barb on the shank adjacent the eye end thereof, said shank having a return bend at the opposite end thereof terminating in a pointed tip, said pointed tip having a second barb on the outer side thereof located at or near the pointed tip, providing a seat near the pointed tip, said pointed tip and second barb lying in a common plane with said first barb, a narrow, elongated, point-shielding member looped over the first barb and extending down to and around the pointed tip and engaged in the said seat.

10. The combination of a fish hook having an eye at one end of a hook shank, a first and a second barb on the shank adjacent the eye end thereof, said shank having a return bend at the opposite end thereof terminating in a pointed tip, said pointed tip having a third barb on the outer side thereof located at or near the pointed tip, providing a seat near the pointed tip, said pointed tip and third barb lying in a plane with the eye and in a plane passing between the first and second barbs, a narrow, elongated, point-shielding member looped over the first and second barbs and extending down to and around the pointed tip and engaged in the said seat.

11. The combination of a fish hook having an eye at one end of a hook shank, a first and a second barb on the shank adjacent the eye end thereof, said shank having a return bend at the opposite end thereof terminating in a pointed tip, said pointed tip having a third barb on the outer side thereof located at or near the pointed tip, providing a seat near the pointed tip, said pointed tip and third barb lying in a plane passing between the first and second barbs, a narrow, elongated, point-shielding member looped over the first and second barbs and extending down to and around the pointed tip and engaged in the said seat.

12. The combination of a fish hook having a first barb at or near the free end of a hook shank, said shank having a return bend at the opposite end thereof terminating in a pointed tip, said pointed tip having a second barb on the outer side thereof, located at or near the pointed tip, providing a seat near the pointed tip, said pointed tip and second barb disposed in a common plane with the first barb, a narrow, elongated, point-shielding member looped over the first barb and extending down to and around the pointed tip and engaged in the said seat.

13. The combination of a fish hook having a first and a second barb at or near the free end of a hook shank, said shank having a return bend at the opposite end thereof, terminating in a pointed tip, said pointed tip having a third barb on the outer side thereof, located at or near the pointed tip, providing a seat near the pointed tip, said pointed tip and third barb disposed in a plane passing between the first and second barbs, a narrow, elongated, point-shielding member looped over the first and second barbs and extending down to and around the pointed tip and engaged in the said seat.

References Cited

UNITED STATES PATENTS

| | | | |
|---|---|---|---|
| 1,191,031 | 7/1916 | Peters | 43—43.2 |
| 1,533,092 | 4/1925 | Bonbright | 43—44.8 |
| 2,651,134 | 9/1953 | Kemmerer | 43—43.4 |
| 3,231,999 | 2/1966 | Gurka | 43—43.4X |
| 3,333,359 | 8/1967 | Barker | 43—44.8X |

SAMUEL KOREN, Primary Examiner

D. J. LEACH, Assistant Examiner